United States Patent [19]
Frazier

[11] Patent Number: 5,681,011
[45] Date of Patent: Oct. 28, 1997

[54] METHOD FOR INJECTING PAYLOADS INTO ORBIT

[75] Inventor: Scott R. Frazier, Herndon, Va.

[73] Assignee: Orbital Sciences Corporation, Dulles, Va.

[21] Appl. No.: 111,095

[22] Filed: Aug. 24, 1993

[51] Int. Cl.$^6$ ............................................. B64G 1/24
[52] U.S. Cl. ............................................ 244/164; 244/172
[58] Field of Search ................................ 244/158 R, 172, 244/164

[56] References Cited

U.S. PATENT DOCUMENTS

| | | | |
|---|---|---|---|
| 4,618,112 | 10/1986 | Keigler . | |
| 4,657,210 | 4/1987 | Hubert et al. | 244/158 R |
| 4,741,502 | 5/1988 | Rosen | 244/172 |
| 4,943,014 | 7/1990 | Harwood et al. | 244/158 R |
| 4,964,340 | 10/1990 | Daniels et al. | 244/172 X |
| 5,067,672 | 11/1991 | Bouzat | 244/158 R |
| 5,090,642 | 2/1992 | Salkeld | 244/158 R |
| 5,143,328 | 9/1992 | Leonard | 244/158 R |
| 5,158,249 | 10/1992 | Uphoff | 244/158 R X |
| 5,163,641 | 11/1992 | Yasaka | 244/164 |
| 5,186,419 | 2/1993 | Scott | 244/172 X |
| 5,242,135 | 9/1993 | Scott | 244/164 X |

FOREIGN PATENT DOCUMENTS

| | | |
|---|---|---|
| 0409721 | 1/1991 | European Pat. Off. . |
| 2850920 | 6/1979 | Germany . |

OTHER PUBLICATIONS

Mark R. Goodell, "Analysis of Suborbital Launch Trajectories for Satellite Delivery" (Dec. 1991).

Paul R. Johnson, "Need Higher–Orbit Payload," *Aviation Week & Space Technology*, Jun. 28, 1993 at 6.

Brown, C.D., "Spacecraft Mission Design," AIAA–Education Series pp. 81–94 (1992).

Crill, Philip D., et al., Method of Placing a Spacecraft Into Final Earth Orbit or Earth Escape Trajectory, U.S. Defensive Publication No. T100, 604, May 5, 1981.

Mission Planner's Guide for the Atlas Launch Vehicle Family, pp. 8–1 to 8–6, Mar. 1989, by General Dynamics Commercial Launch Services, Inc.

Ariane 4 User's Manual, pp. Feb. 1–Feb. 4, Apr. 1983, by Arianespace.

Customer Handbook for Titan III, pp. Feb. 5 to Feb. 12, Dec. 1987, by Martin Marietta/Commercial Titan, Inc.

Commercial Delta II Payload Planner Guide, pp. Feb. 1 to Feb. 4, Dec. 1989, by Mc Donnell Douglas Commercial Delta, Inc.

Conestoga Expendable Launch Vehicle/Payload Interface Specification and User's Guide, pp. Mar. 1 to Mar 11, Jun. 15, 1992, by EER Systems Corporation.

*Primary Examiner*—Andres Kashnikow
*Assistant Examiner*—Virna Lissi Mojica
*Attorney, Agent, or Firm*—Jenner & Block

[57] ABSTRACT

The present invention comprises a method for injecting a heavier payload into orbit than is possible using a traditional method and the same rocket booster launch vehicle. The method of the present invention does not utilize a parking orbit and does not perform orbital injection at perigee or apogee of the desired orbit. Rather, in the present method the flight path angle is positive at the final lower stage booster burn so as to boost the perigee kick motor and payload into a suborbital trajectory having a low perigee, which may be below the surface of the Earth. In the preferred embodiment, the launch vehicle maintains a negative flight path angle during the PKM burn. The PKM burn does not occur at perigee, but perigee is at the desired location when the PKM burn is complete. Use of this method increases the payload capacity of some launch vehicles by up to fifty percent (50%).

23 Claims, 5 Drawing Sheets

METHOD FOR INJECTING PAYLOADS INTO ORBIT

BACKGROUND OF THE INVENTION

The invention relates to a method for injecting payloads into orbit, and more particularly, to a method employing a suborbital trajectory instead of a conventional parking orbit and wherein the final launch booster burn for injection into a desired elliptical orbit, for example, a geosynchronous transfer orbit ("geo-transfer orbit" or "GTO"), is non-apsidal (i.e., does not occur at the apogee or perigee of that orbit) and occurs while the flight path angle is either negative or positive.

Many types of orbital trajectories can utilize this method, including: (1) geo-transfer orbits; (2) "Molniya" orbits or other elliptical orbits having a specified initial position of the line of apsides; and (3) any trajectories requiring significantly lower inclinations than their launch site latitudes. Although a geo-transfer orbit is used as the primary example in this specification, those skilled in the art will appreciate the method's application to the other types of orbital trajectories.

The process of injecting a payload into orbit with a multi-stage launch booster vehicle has several constraints. The booster must provide sufficient energy or velocity to reach orbital conditions and, if the desired orbit is elliptical, it may be desirable to place the line of apsides (i.e., the line connecting orbit apogee and perigee) at a specific initial location. For example, with geo-transfer orbits it is often a requirement that the line of apsides be at or near the equator. This is because the burn performed at apogee often needs to combine the orbit raising maneuver to geosynchronous altitude with an inclination change maneuver to achieve 0° inclination (geo-stationary orbit), as illustrated in FIGS. 1 and 2A.

"Molniya"-type orbits are another example of orbits with respect to which it is desirable to place the line of apsides at a specific location. By definition the Molniya orbits are highly elliptical and inclined 63.4°, which is a unique inclination in that the line of apsides does not rotate—i.e., apogee and perigee remain at the same latitude. These orbits often are used where long periods of satellite operation are desired over the northern hemisphere—i.e., apogee over the northern hemisphere. This requires that perigee be placed in the southern hemisphere, typically at a latitude of 63.4° south. The placement of the perigee at locations far from the nominal burnout location of the booster for vehicles launched in the northern hemisphere, as is required for geo-transfer and Molniya orbits, complicates the trajectory design.

As is known to those skilled in the art, the maximum energy change for a fixed amount of velocity change ("$\Delta V$") is created by adding the velocity at perigee of the final orbit. For this reason, it usually is desirable to inject into an elliptical orbit at perigee of that orbit. For the geo-transfer and Molniya orbits (with perigees located, respectively, near the equator or in the southern hemisphere), an optimal booster trajectory often does not leave the last stage burnout condition at perigee. The desired perigee for these cases is usually very far downrange (e.g., equator or 63.4° south) from an efficient booster burnout position. This is particularly true for launches from the United States where the burnout location is often greater than 25° north for geo-transfer orbits, or in the northern hemisphere for Molniya orbits.

As noted above, it is desirable in GTO and Molniya missions for the final stage burn to occur near perigee of the injected orbit. Because perigee is very far downrange in these cases, the traditional trajectory design uses a parking orbit (i.e., a temporary orbit of essentially constant altitude) to coast to the desired perigee location to perform the final stage burn.

The mission profile and orbit geometry of a launch trajectory to a geosynchronous orbit employing a conventional parking orbit 30 are shown, respectively, in FIGS. 1 and 2A. In this method, the booster places the payload and the last stage, often called a perigee kick motor ("PKM"), into the parking orbit. Using the lowest possible parking orbit (approximately 90–110 nautical miles (nm)) maximizes payload capacity.

The upper stage size (propellant load, total impulse, etc.) is defined primarily by the size of the payload, the $\Delta V$ desired and the parking orbit selected. Other factors such as stage burnout weight and specific impulse are also variable factors, but these are motor technology parameters that do not qualitatively change much from design to design. In practice, PKM's are often solid rocket motors due to their superior mass fraction; however, they generally are available only in discrete sizes. If the theoretical PKM size that matches the payload and optimal parking orbit is not available, there are several alternatives. If the propellant required is slightly below an "off-the-shelf" size, often the propellant can be machined out (i.e., off-loaded), reducing the total impulse. Obviously this is not optimal because the motor case was designed for a full propellant load and essentially is slightly larger than required to hold the propellant. This is tolerated because of the cost of developing and qualifying a new motor. Not all motors can be off-loaded, and usually they can only be off-loaded about 20%. If the propellant required is more than what is available from a given motor one alternative is to move up to the next larger size motor and off-load propellant, assuming it can be off-loaded enough. Another alternative is to reduce the payload weight so that the smaller motor can provide the $\Delta V$ desired. The use of a higher energy parking orbit decreases the $\Delta V$ requirement on the PKM while taking advantage of the reduced payload weight. This is inefficient, however, because the booster and the payload are carried to higher energy as well, thus significantly decreasing payload capacity.

Given the high costs of missions, it would often be advantageous to carry a heavier payload than is possible by the conventional parking orbit method. Thus, a method that allows a lower stage configuration of a given capacity to be used in connection with a larger PKM than is possible using the parking orbit method is desirable.

OBJECT AND SUMMARY OF THE INVENTION

A first object of the invention is to allow lower stages to boost heavier upper stages to the desired upper stage or PKM burn location than is possible following a trajectory that includes a conventional parking orbit.

A resulting object is to allow booster stages to carry larger payloads into orbit than is possible using prior methods.

A further object is to eliminate or reduce the requirement to off-load propellant from upper stages that are too large to inject into a typical parking orbit conventionally required to reach the desired burn location of the upper stage.

As discussed above, conventionally, before a vehicle is injected into a desired elliptical orbit, it is placed in a lower altitude parking orbit. The vehicle then coasts downrange to the perigee of the desired elliptical orbit, where the PKM is burned to insert the vehicle payload into such orbit.

In the present method, on the other hand, the "larger" upper stage coasts to the injection point (i.e., location at which the upper stage burn occurs to inject the vehicle payload into the desired elliptical orbit) on a suborbital, "pseudo-parking orbit" trajectory. The vehicle reaches a higher altitude than the typical parking orbit altitude. Because this trajectory is suborbital, the vehicle falls back toward the Earth to a point where the upper stage or PKM is burned to insert the vehicle into the elliptical orbit. The PKM is burned above a minimum altitude (approximately 100 nm) to avoid excessive free molecular heating of the vehicle. This PKM burn is non-apsidal—i.e., it does not occur near either apogee or perigee of the elliptical orbit. However, the method of the present invention allows the placement of the perigee wherever desired, allows the use of larger upper stages (thereby reducing or eliminating the need to off-load the motor), and improves performance.

Although the non-apsidal trajectory of the present invention is carried out by firing rocket booster engines at non-zero flight path angles and at slightly higher altitudes than would be the case for trajectories using a conventional parking orbit, acceptable performance is achieved because a larger PKM can be used. The larger PKM provides the additional energy that makes up for the non-optimal aspects of this trajectory and permits the final elliptical orbit to have the desired perigee location.

In an alternative embodiment of the method of the present invention, the PKM is burned before apogee of the suborbital trajectory where the flight path angle is positive to inject the payload into the elliptical orbit at a location downrange from perigee of the elliptical orbit. In another alternative embodiment, the firing of the upper stage engine occurs at apogee of the suborbital trajectory.

BRIEF DESCRIPTION OF THE DRAWINGS

FIG. I is a perspective diagram of the mission profile for injecting a payload into a geosynchronous transfer orbit via a conventional parking orbit.

DETAILED DESCRIPTION OF THE PREFERRED EMBODIMENT

Figure 1:
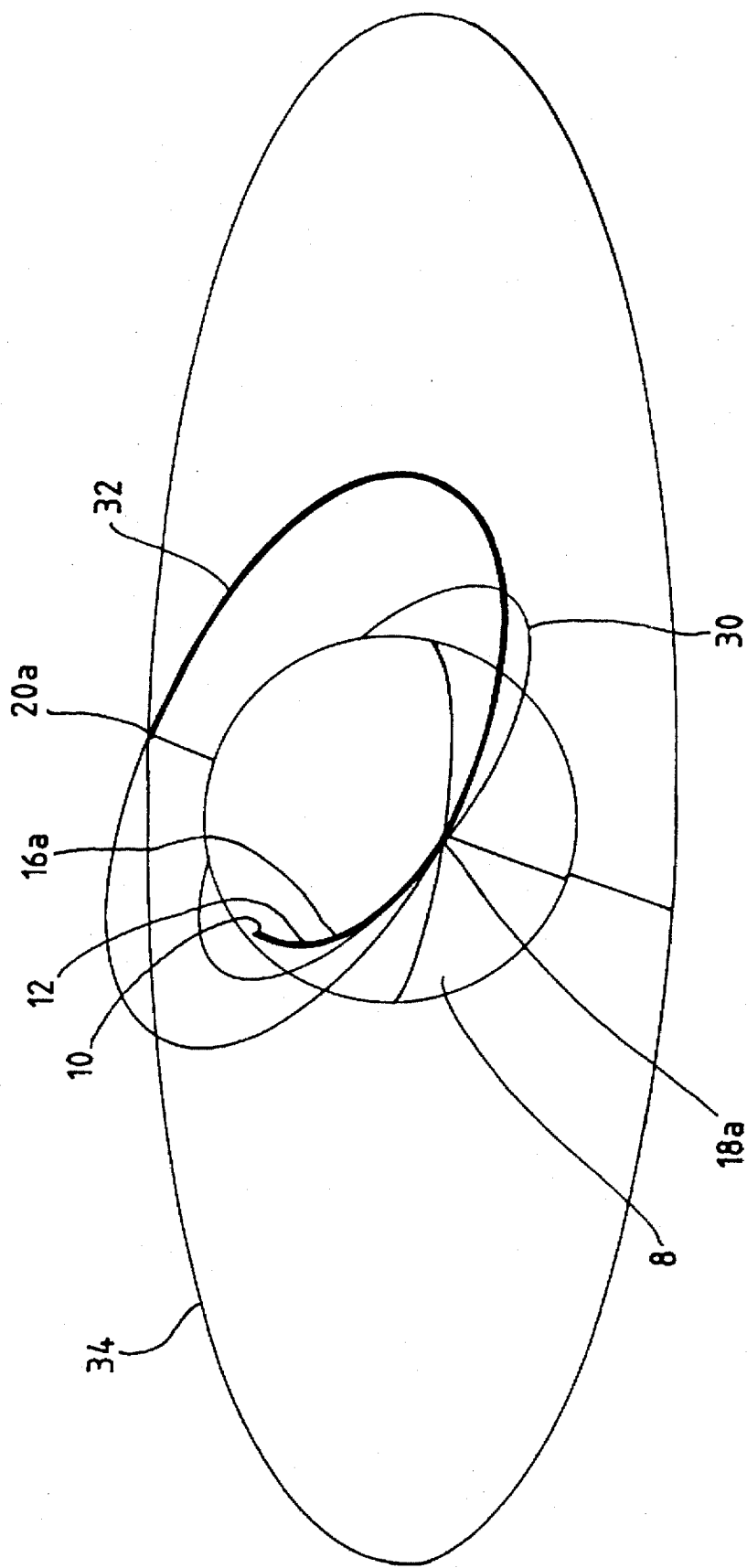
Figure 2A:
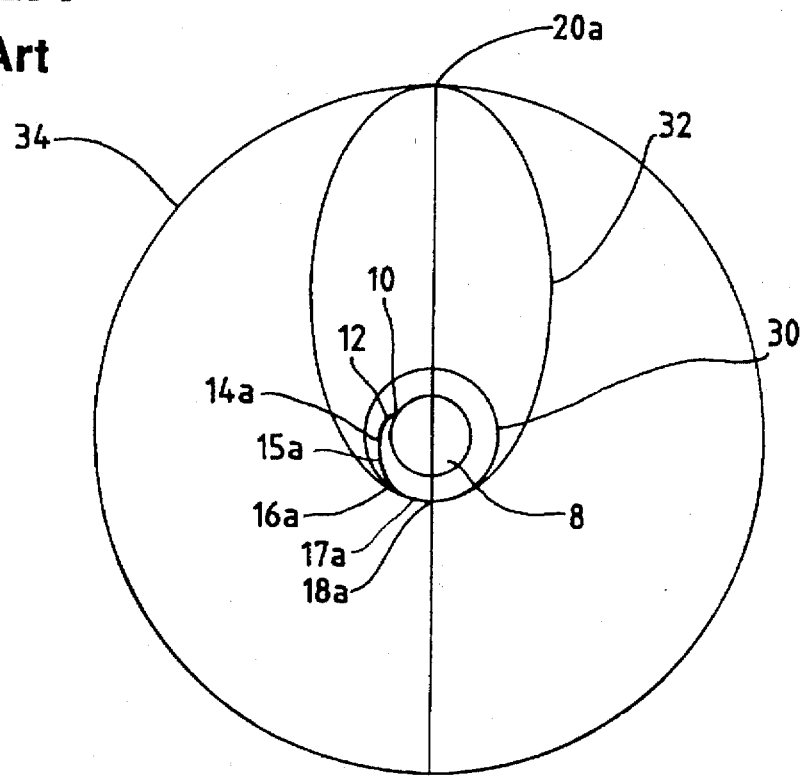
FIG. 2A is another diagram of the orbit geometry associated with the trajectory of a launch booster vehicle for injecting a payload into a geosynchronous transfer orbit via a conventional parking orbit.
Figure 2B:
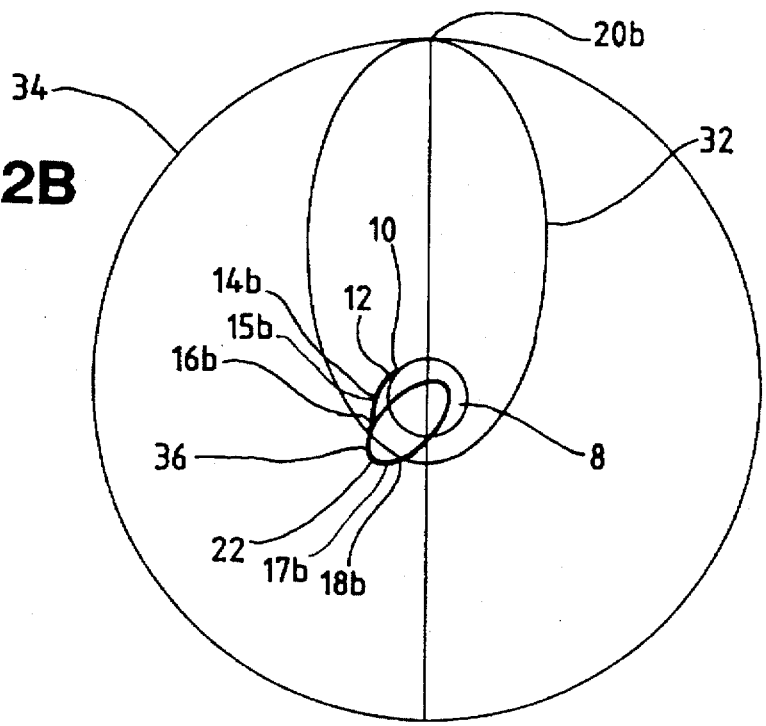
FIG. 2B is a diagram of the orbit geometry associated with the trajectory of a launch booster vehicle for injecting a payload into a geosynchronous transfer orbit via the suborbital trajectory used in the method of the present invention.

The initial portion of the launch trajectory of the present invention is the same as trajectories employing a conventional parking orbit. Thus, as shown in FIGS. 1, 2A and 2B for a typical launch booster vehicle (not shown) having three lower stages and an upper stage or PKM, the vehicle carrying the payload is launched from the Earth 8 at a launch site 10 by firing the first stage of the launch vehicle. Although the method of the present invention is described in terms of a launch booster vehicle having four stages—three lower stages and an upper stage—depending upon launch vehicle design and mission requirements, the number of stages utilized could vary. After stage 1 has completed its burn, the second stage is fired at location 12 on the trajectory. After stage 2 has completed its burn conventionally at location 14a, the method of the present invention departs from that where a conventional parking orbit is used.

Figure 3:
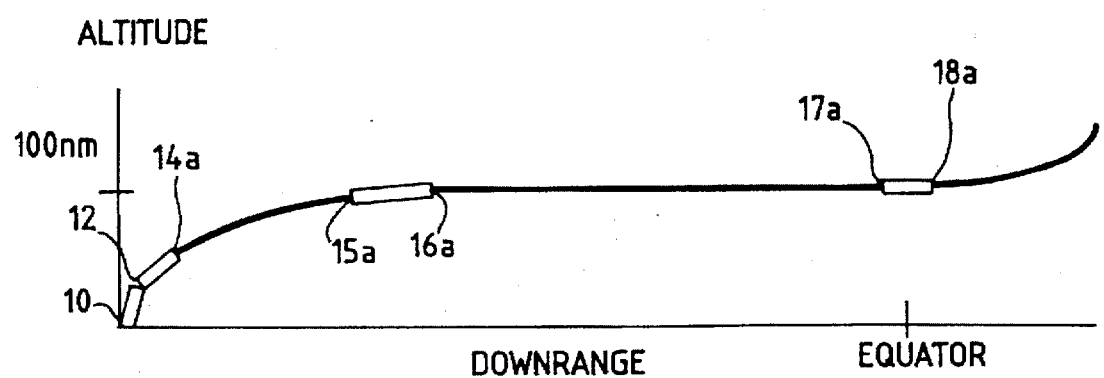
FIG. 3 is a graph illustrating the relationship between altitude and downrange distance over a trajectory for injecting a payload into a geosynchronous transfer orbit via a conventional parking orbit and the segments of the trajectory over which the three lower stage booster motors and the PKM burn.

In particular, to reach a conventional parking orbit, the final lower stage engine (i.e., stage 3 in the example shown in FIGS. 1 and 2A) is fired after the vehicle has coasted for a distance downrange to location 15a on the trajectory, as shown in FIG. 3, so as to complete its burn at a flight path angle of essentially 0° at location 16a on the trajectory. The burn of this final lower stage engine is sufficient to place the vehicle with its payload into the desired parking orbit 30, typically having an altitude of about 90 to 110 nautical miles. The PKM then burns from location 17a to location 18a to achieve insertion into the elliptical orbit.

Figure 4:
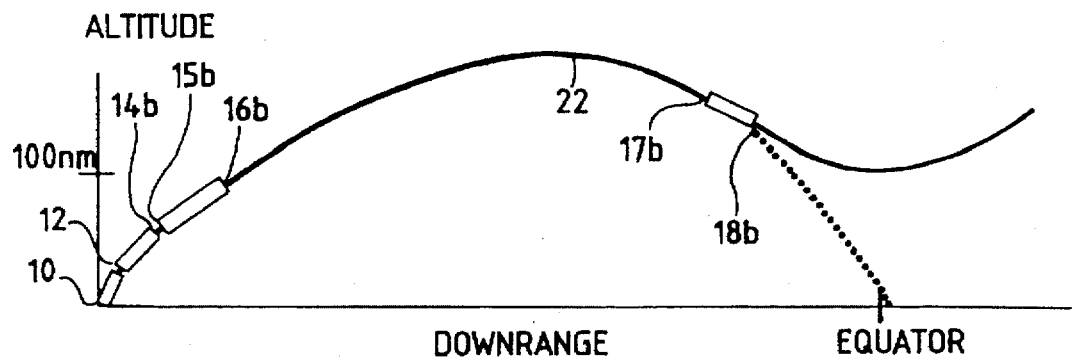
FIG. 4 is a graph illustrating the relationship between altitude and downrange distance over a trajectory for injecting a payload into a geosynchronous transfer orbit via the trajectory used in the method of the present invention and the segments of the trajectory over which the three lower stage booster motors and the PKM burn.
Figure 5:
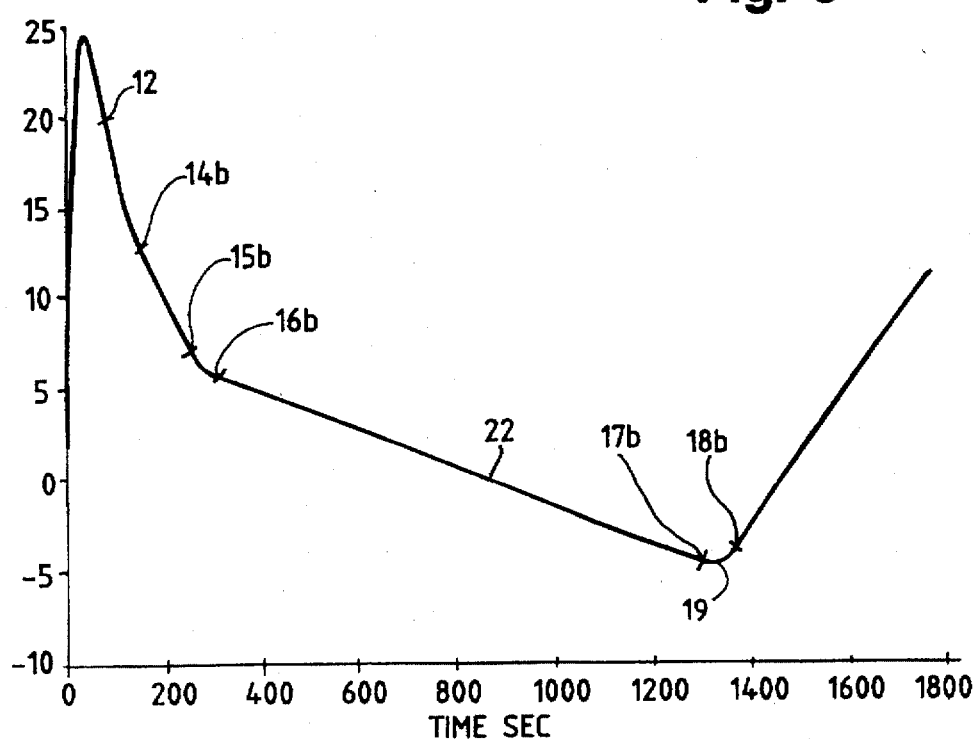
FIG. 5 is a graph showing the flight path angle (i.e., inertial gamma) of the launch booster vehicle during the launch sequence.

In the method of the present invention, however, the final lower stage engine (i.e., stage 3 in the example) is fired earlier in the trajectory at location 15b so as to complete its burn at a positive flight path angle (6° in the example, as shown in FIG. 5) at location 16b on the trajectory as shown in FIGS. 2B and 4. With reference to FIGS. 2B and 4, the flight path angle is positive throughout the firing of the final lower stage booster in order to increase the altitude of the apogee and correspondingly decrease the perigee of the intermediate suborbital trajectory 36. This is illustrated by the curves showing the relationship between altitude and range from the launch site in FIG. 3 for a conventional parking orbit and FIG. 4 for the non-apsidal trajectory of the present invention. The higher apogee allows the vehicle to coast much farther downrange before another rocket burn is required, but it is not necessary to coast all the way down to the desired perigee location before firing the upper stage (i.e., the PKM, although with the method of the present invention it is not fired at perigee) to boost the vehicle and payload into the desired elliptical orbit.

With reference to FIGS. 2B and 4, the vehicle reaches a peak altitude (i.e., apogee) in its suborbital trajectory 36 at point 22, beyond which the vehicle loses altitude. The shape of the suborbital trajectory 36 is selected so as to have a location at which the firing of the upper stage provides the additional energy needed to reach the desired final elliptical orbit (e.g., geosynchronous transfer orbit 32 in FIG. 2B) having the perigee at the desired location. As illustrated in FIGS. 4 and 5, the upper stage is fired over a portion of the suborbital trajectory from 17b to 18b where the flight path angle is negative. As illustrated in FIG. 4, the upper stage is burned over a portion of the trajectory ending at location 18b substantially before the vehicle is over the equator.

Thus, in the trajectory of the present invention, there is non-apsidal injection because none of the vehicle stages are fired near an apogee or perigee of the elliptical orbit 32. Conventionally, both the parking orbit and final elliptical orbit injections occur at or near an apside. In the method of the present invention, the firing of the upper stage causes the orbit parameters (i.e., apogee, perigee and line of apsides) to change dramatically as the vehicle transitions from suborbital to orbital flight.

As described above, the final elliptical orbit can be, for example, a geosynchronous transfer orbit 32, which is a type known in the art and which is the same for both the method of the present invention and methods employing a conventional parking orbit, as illustrated in FIGS. 2A and 2B. In that case the final orbital destination is a geosynchronous orbit 34. Insertion into geosynchronous orbit 34 occurs at location 20a in the conventional method. Similarly, insertion into geosynchronous orbit 34 occurs at location 20b for the orbit geometry depicted in FIG. 2B.

The suborbital trajectory of the present invention enables a larger initial mass to be placed at the desired injection point, thereby allowing a larger upper stage rocket engine to be used, which results in the ability to inject larger payloads into the desired orbits.

The non-optimal aspects of this method (not burning at apogee or perigee, using non-zero flight path angles, increasing apogee in the suborbital trajectory) are more than overcome by the benefit of using the larger PKM. The net result is that through use of the present method the payload capability of some launch vehicles and orbits can be increased by up to fifty percent (50%), although more typically 10%–20%.

FIG. 5 is a graph depicting the flight path angle (i.e., inertial gamma) of the launch booster vehicle during the launch sequence. The flight path angle of a vehicle flying directly away from or parallel to the Earth's surface is 90° or 0°, respectively. The inertial velocity while sitting on the launch pad is non-zero due to the rotation of the Earth. Correspondingly the inertial gamma is zero because this velocity is parallel to the Earth's surface. As the vehicle lifts off the inertial velocity vector gets larger and inertial gamma increases as vertical and downrange speed is added. Later in the trajectory inertial gamma decreases as the velocity vector again becomes close to parallel to the Earth's surface. As the lower stages of the launch booster vehicle are burned, its flight path angle decreases until a location (location 19 in FIG. 5) on the trajectory following the firing of the upper stage or PKM.

At point 16b in FIG. 5, the stage 3 engine burns out, and the vehicle begins to coast in its suborbital trajectory. Because the vehicle speed at this point is less than required for circular orbit at this altitude, the force of the Earth's gravity on the vehicle decreases the vehicle's flight path angle and eventually causes the vehicle to fall back toward the Earth 8. When the vehicle is falling toward the Earth 8 in its suborbital trajectory, its flight path angle is negative.

When the upper stage or PKM is ignited at point 17b in FIG. 5, the velocity increases beyond the circular orbit speed for that altitude and the flight path angle eventually begins to increase and becomes positive again, signifying that the vehicle's flight path is again away from the Earth 8. The flight path angle is negative but increasing as the vehicle enters its elliptical orbit.

Figure 6:
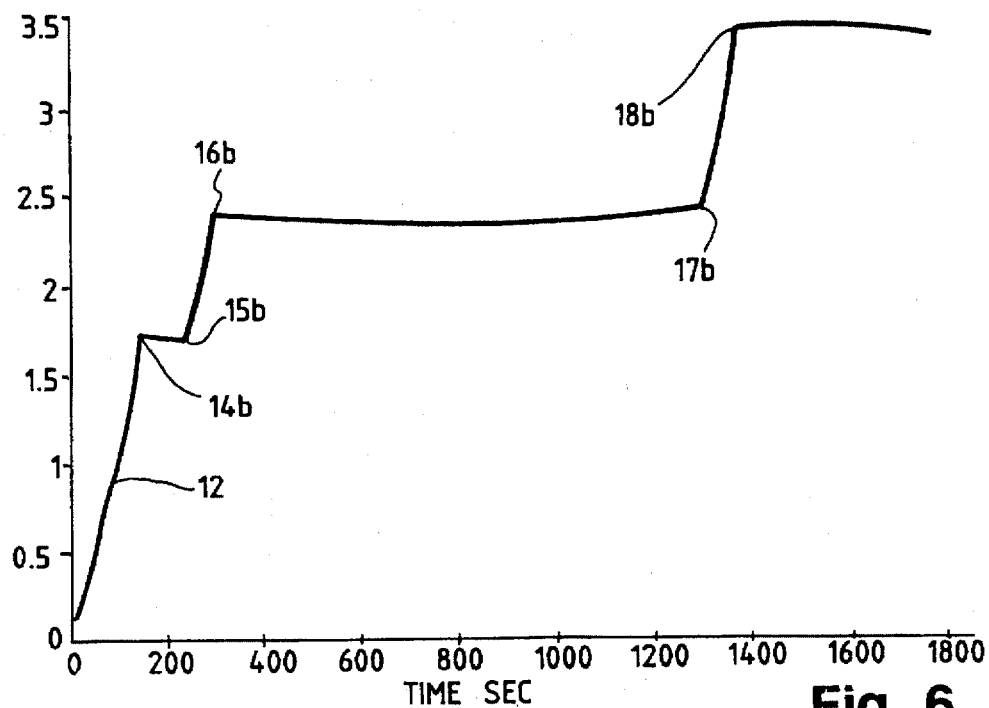
FIG. 6 is a graph showing the inertial velocity of the launch booster vehicle during the launch sequence.

The graph in FIG. 6 shows the inertial velocity of the launch booster vehicle during the launch sequence. The inertial velocity steadily increases while the first two stages are burned. Between points 14b and 15b, the vehicle coasts, and its inertial velocity slightly decreases. At point 15b stage 3 is ignited, and its thrust causes the inertial velocity to increase again. Between points 16b and 17b, the vehicle coasts in its suborbital trajectory, with velocity being converted to gravitational potential energy and then back to kinetic energy once past apogee causing only small changes in inertial velocity. At point 17b, PKM ignition gives the inertial velocity another boost. The inertial velocity levels off when the PKM is burned out, again only changing as kinetic energy becomes gravitational potential energy.

Figure 2C:
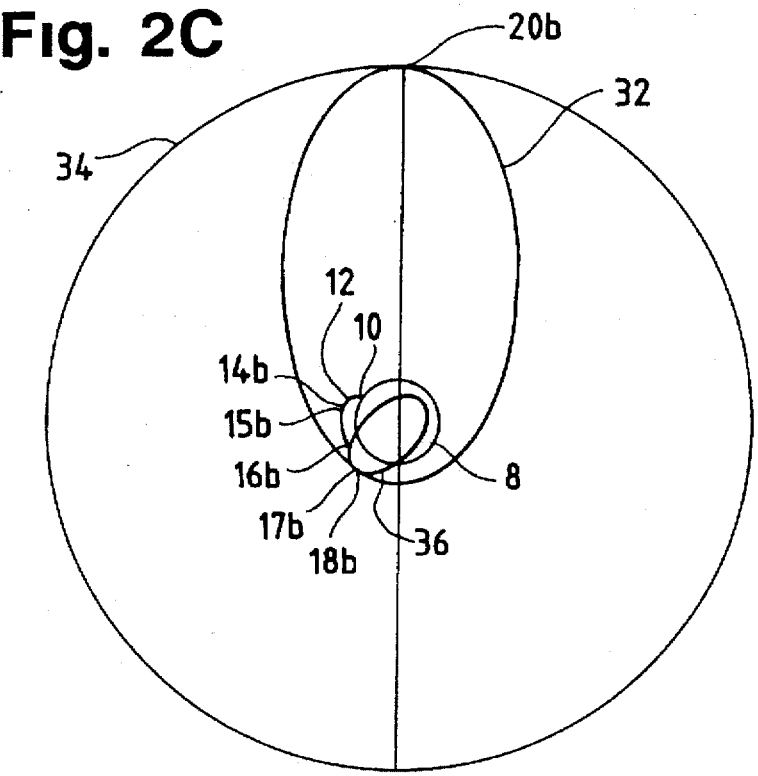
FIG. 2C is a diagram of the orbit geometry associated with the trajectory of a launch booster vehicle for injecting a payload into a geosynchronous transfer orbit via the suborbital trajectory used in an alternative embodiment of the present invention.
Figure 2D:
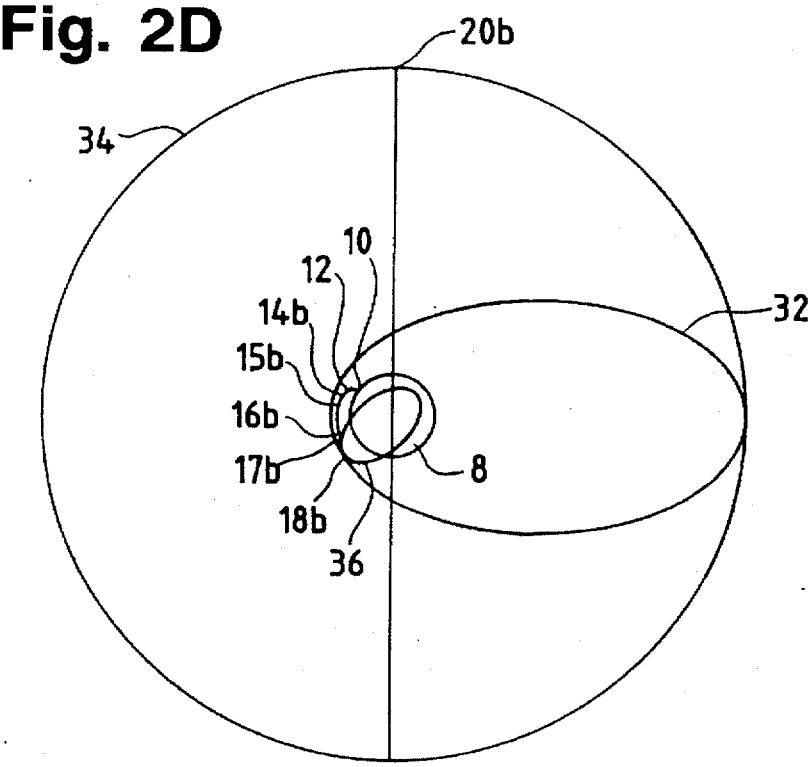
FIG. 2D is a diagram of the orbit geometry associated with the trajectory of a launch booster vehicle for injecting a payload into a geosynchronous transfer orbit via the suborbital trajectory used in invention.

Other embodiments of the present invention are illustrated in FIGS. 2C and 2D. In the embodiment depicted in FIG. 2C, the firing of the upper stage engine occurs at the apogee of suborbital trajectory 36. In the embodiment depicted in FIG. 2D, the perigee of elliptical orbit 32 is up range from the location at which the payload is injected into elliptical orbit 32. The trajectory of the vehicle is increasing in altitude throughout the firing of the upper stage engine.

Whereas the present invention has been described with respect to specific embodiments thereof, it will be understood that various changes and modifications will be suggested to one skilled in the art and it is intended that the invention encompass such changes and modifications as fall within the scope of the appended claims.

What is claimed is:

1. A method for injecting a payload into an elliptical orbit having its line of apsides at a specific initial location comprising the steps of:

firing at least one lower stage engine of a rocket booster vehicle carrying the payload so as to launch the rocket booster vehicle and payload along a suborbital trajectory;

allowing the vehicle to coast downrange in the suborbital trajectory; and firing an upper stage engine of the rocket booster vehicle to cause the payload to be injected into the elliptical orbit, wherein the location at which firing of the upper stage engine is commenced is not at or near perigee or apogee of the elliptical orbit.

2. The method of claim 1 wherein the flight path angle of the rocket booster vehicle is positive along a first portion of the suborbital trajectory along which the at least one lower stage engine is fired.

3. A method for injecting a payload into an elliptical orbit having its line of apsides at a specific initial location comprising the steps of:

firing at least one lower stage engine of a rocket booster vehicle carrying the payload so as to launch the rocket booster vehicle and payload along a suborbital trajectory;

allowing the vehicle to coast downrange in the suborbital trajectory; and firing an upper stage engine of the rocket booster vehicle to cause the payload to be injected into the elliptical orbit, wherein the location at which firing of the upper stage engine is commenced is not at perigee of the elliptical orbit;

wherein the flight path angle of the rocket booster vehicle is positive along a first portion of the suborbital trajectory along which the at least one lower stage engine is fired and wherein the flight path angle of the rocket booster vehicle is negative along a second portion of the suborbital trajectory and the upper stage engine commences firing along the second portion.

4. The method of claim 3 wherein the flight path angle of the rocket booster vehicle is negative throughout the firing of the upper stage engine.

5. The method of claim 4 wherein the thrust of the upper stage engine is pointed substantially along the velocity vector of the rocket booster vehicle throughout the firing of the upper stage engine.

6. The method of claim 4 wherein the flight path angle of the rocket booster vehicle is more negative when firing of the upper stage engine is commenced than when it is completed.

7. The method of claim 4 wherein the firing of the upper stage engine is completed above a minimum altitude whereby excessive free molecular heating of the vehicle is avoided.

8. The method of claim 1 wherein the location at which firing of the upper stage engine is commenced is not at or near apogee of the elliptical orbit.

9. The method of claim 1 wherein the location at which firing of the upper stage engine is commenced is not at apogee of the suborbital trajectory.

10. A method for injecting a load into an elliptical orbit having its line of apsides at a specific initial location comprising the steps of:

firing at least one lower stage engine of a rocket booster vehicle car in the a load so as to launch the rocket booster vehicle and payload along a suborbital trajectory;

allowing the vehicle to coast downrange in the suborbital trajectory; and firing an upper stage engine of the rocket booster vehicle to cause the payload to be injected into the elliptical orbit, wherein the location at which firing of the upper stage engine is commenced is not at perigee of the elliptical orbit and wherein the firing of the upper stage engine occurs at the apogee of the suborbital trajectory.

11. The method of claim 1 wherein the perigee of the elliptical orbit is downrange from the location at which the payload is injected into the elliptical orbit.

12. The method of claim 1 wherein the perigee of the elliptical orbit is up range from the location at which the payload is injected into the elliptical orbit.

13. The method of claim 1 wherein the elliptical orbit is a geosynchronous transfer orbit.

14. The method of claim 1 wherein the elliptical orbit is a Molniya orbit.

15. A method for injecting a payload into an elliptical orbit having its line of apsides at a specific initial location comprising the steps of:

firing at least one lower stage engine of a rocket booster vehicle carrying the payload so as to launch the rocket booster vehicle and payload along a suborbital trajectory, wherein the altitude of the trajectory is increasing throughout the firing of the at least one lower stage engine;

allowing the vehicle to coast downrange in the suborbital trajectory to a location downrange from the apogee of that trajectory; and firing an upper stage engine of the rocket booster vehicle to cause the payload to be injected into the elliptical orbit, wherein the trajectory of the vehicle is decreasing in altitude throughout the firing of the upper stage engine.

16. The method of claim 15 wherein the firing of the upper stage engine does not occur at perigee of the elliptical orbit.

17. The method of claim 15 wherein the firing of the upper stage engine does not occur at apogee of the elliptical orbit.

18. The method of claim 15 wherein the firing of the upper stage engine occurs before the trajectory of the payload reaches the perigee of the elliptical orbit.

19. The method of claim 15 wherein the perigee of the elliptical orbit is downrange from the location at which the payload is injected into the elliptical orbit.

20. A method for injecting a payload into an elliptical orbit having its line of apsides at a special initial location comprising the steps of:

firing at least one lower stage engine of a rocket booster vehicle carrying the payload so as to launch the rocket booster vehicle and payload along a suborbital trajectory, wherein the altitude of the trajectory is increasing throughout the firing of the at least one lower stage engine;

allowing the vehicle to coast downrange in the suborbital trajectory to a location up range from the apogee of that trajectory; and firing an upper stage engine of the rocket booster vehicle to cause the payload to be injected into the elliptical orbit, wherein the trajectory of the vehicle is increasing in altitude throughout the firing of the upper stage engine.

21. The method of claim 20 wherein the perigee of the elliptical orbit is up range from the location at which the payload is injected into the elliptical orbit.

22. A method for injecting a payload into an elliptical orbit having its line of apsides at a specific initial location comprising the steps of:

firing at least one lower stage engine of a rocket booster vehicle carrying the payload so as to launch the rocket booster vehicle and payload along a suborbital trajectory;

allowing the vehicle to coast downrange in the suborbital trajectory; and firing an upper stage engine of the rocket booster vehicle to cause the payload to be injected into the elliptical orbit;

wherein the flight path angle of the rocket booster vehicle is positive along a first portion of the suborbital trajectory along which the at least one lower stage engine is fired and wherein the flight path angle of the rocket booster vehicle is negative along a second portion of the suborbital trajectory and the upper stage engine commences firing along the second portion.

23. A method for injecting a payload into an elliptical orbit having its line of apsides at a specific initial location comprising the steps of:

firing at least one lower stage engine of a rocket booster vehicle carrying the payload so as to launch the rocket booster vehicle and payload along a suborbital trajectory;

allowing the vehicle to coast downrange in the suborbital trajectory; and firing an upper stage engine of the rocket booster vehicle to cause the payload to be injected into the elliptical orbit;

wherein the firing of the upper stage engine occurs at the apogee of the suborbital trajectory.

\* \* \* \* \*

UNITED STATES PATENT AND TRADEMARK OFFICE
CERTIFICATE OF CORRECTION

PATENT NO. : 5,681,011
DATED : October 28, 1997
INVENTOR(S) : Scott R. Frazier

It is certified that error appears in the above-indentified patent and that said Letters Patent is hereby corrected as shown below:

Column 3, line 57, before "invention;" insert --another alternative embodiment of the present--.

Column 7, line 26, "load" should be --payload--.

Column 7, line 30, "car in the a load" should be -- carrying the payload--.

Signed and Sealed this

Third Day of February, 1998

BRUCE LEHMAN

*Attest:*

*Attesting Officer*          Commissioner of Patents and Trademarks